US006521731B2

(12) United States Patent
Dershem et al.

(10) Patent No.: US 6,521,731 B2
(45) Date of Patent: Feb. 18, 2003

(54) RADICAL POLYMERIZABLE COMPOSITIONS CONTAINING POLYCYCLIC OLEFINS

(75) Inventors: Stephen M. Dershem, San Diego, CA (US); Kevin J. Forrestal, Poway, CA (US)

(73) Assignee: Henkel Loctite Corporation, Rocky Hill, CT (US)

( * ) Notice: Subject to any disclaimer, the term of this patent is extended or adjusted under 35 U.S.C. 154(b) by 0 days.

(21) Appl. No.: 09/779,694

(22) Filed: Feb. 7, 2001

(65) Prior Publication Data

US 2003/0008992 A1 Jan. 9, 2003

(51) Int. Cl.[7] .............................................. C08F 122/40

(52) U.S. Cl. ....................... 526/262; 526/258; 526/271; 526/279; 526/281; 526/284; 526/306

(58) Field of Search ................................ 526/258, 262, 526/271, 281, 279, 284, 306, 348, 348.5

(56) References Cited

U.S. PATENT DOCUMENTS 5,212,043 A * 5/1993 Yamamoto et al. ......... 430/192

* cited by examiner

*Primary Examiner*—Helen L. Pezzuto
(74) *Attorney, Agent, or Firm*—Stephen E. Reiter; Foley & Lardner

(57) ABSTRACT

In accordance with the present invention, there are provided free-radical polymerizable compositions comprising polycyclic olefins, wherein the polycyclic olefins contain little, if any, cyclopentenyl unsaturation. As a result, these olefins are sufficiently reactive with the propagating free-radicals during cure to provide a highly crosslinked thermoset resin. Moreover, invention compositions comprise high molecular weight polycyclic olefins having low volatility. Accordingly, the observed undesirable weight loss upon cure of prior art thermosetting compositions is considerably reduced. Further provided by the present invention are compositions comprising functionalized polycyclic olefin monomers. These functionalized olefin monomers provide additional benefits such as increased adhesion to a variety of surfaces and greater control over glass transition temperatures.

28 Claims, No Drawings

RADICAL POLYMERIZABLE COMPOSITIONS CONTAINING POLYCYCLIC OLEFINS

FIELD OF THE INVENTION

The present invention relates to compositions containing polycyclic olefins which polymerize under free-radical conditions to generate crosslinked polymers and copolymers. The invention relates particularly to polycyclic olefins which primarily contain bicycloheptenyl unsaturation units.

BACKGROUND OF THE INVENTION

Polymers and copolymers synthesized from polycyclic olefin monomers have attracted much interest from the scientific community due to the desirable properties often exhibited by these materials. Cyclic olefin copolymers (COC's) possess a unique combination of properties such as low density, low moisture absorption, low birefringence, high transparency, and high strength. Depending on the polycyclic olefin monomer and the polymerization conditions, materials can also be produced having a wide range of glass transition temperatures. As a result, these materials are being tested for use in diverse applications such as electronics, CD-ROM disks, optical lenses, barrier films, and medical appliances.

A particularly attractive characteristic displayed by polycyclic olefin monomers is the ability to polymerize via a variety of reaction mechanisms. It is well-known that polycyclic olefins can be polymerized and/or copolymerized free-radically, cationically, or coordinatively using organometallic catalysts. Due to this mechanistic flexibility, a wide variety of functionalized comonomers can be incorporated into the cyclic olefin copolymer, which provides further control over the bulk properties of the material.

Since polycyclic olefin monomers have the ability to polymerize free-radically, these monomers have been explored as potential candidates for use in free-radical cured thermosetting compositions. Indeed, polycyclic olefins have been shown to readily copolymerize with electron deficient olefins. Thermosetting resins incorporating polycyclic olefins can be expected to have many desirable properties, such as high Tg, hydrophobicity, and low shrinkage upon cure. However, in order to obtain these desirable properties in a thermoset resin, the polycyclic olefin must be of a certain minimum molecular weight (i.e., the volatility of the olefin should be low) and must be sufficiently reactive with the propagating free radicals during cure to produce a highly crosslinked thermoset network.

Unfortunately, most common and inexpensive polycyclic olefin monomers, such as norbornene, norbornadiene, dicyclopentadiene (DCPD), and the like, are deficient in these areas. Specifically, norbornene, norbornadiene, and DCPD are too volatile for use in many thermoset applications. In addition, the cyclopentenyl unsaturation of DCPD is insufficiently reactive for many thermoset applications. Indeed, it is well known that the cyclopentenyl double bond is far less reactive than the norbornenyl double bond, due to the low ring strain associated with the cyclopentenyl ring (relative to the bicycloheptenyl group). Moreover, the allylic hydrogen atoms on the cyclopentenyl rings may contribute to chain transfer reactions, thereby reducing the molecular weight of the growing polymer chains during cure. Thus, optimum free-radically cured thermosets incorporating polycyclic olefins are only produced when the polycyclic olefin has low volatilty and contains little, if any, cyclopentenyl unsaturation.

Accordingly, there is a need for polycyclic olefin monomers which can be readily incorporated into free-radically cured thermosetting resin compositions, thereby producing thermosets having a unique combination of beneficial properties.

BRIEF DESCRIPTION OF THE INVENTION

In accordance with the present invention, there are provided free-radically polymerizable compositions comprising polycyclic olefins, wherein the polycyclic olefins contain little, if any, cyclopentenyl unsaturation. As a result, these olefins are sufficiently reactive with the propagating free-radicals during cure to provide a highly crosslinked thermoset resin. Moreover, invention compositions comprise high molecular weight polycyclic olefins having low volatility. Accordingly, the undesirable weight loss upon cure observed with many thermosetting compositions is considerably reduced.

Further provided by the present invention are compositions comprising functionalized polycyclic olefin monomers. These functionalized olefin monomers provide additional benefits such as increased adhesion to a variety of surfaces as well as greater control over glass transition temperatures.

DETAILED DESCRIPTION OF THE INVENTION

In accordance with the present invention, there are provided free-radically polymerizable compositions comprising (A) at least one polycyclic olefin monomer, said monomer having at least one terminal norbornenyl functional group, wherein said monomer contains little, if any, cyclopentenyl unsaturation, (B) a maleimide or succinimide, (C) optionally, one or more free radical curing co-monomers, and (D) in the range of 0.2 up to 5 wt % of at least one curing catalyst, based on the total weight of the composition.

In one embodiment, polycyclic olefin monomers contemplated for use in the practice of the present invention have the following structures:

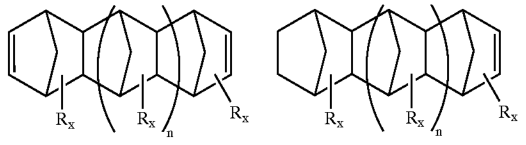

wherein each R is (a) independently hydrogen or substituted or unsubstituted alkyl, and each x is independently 0, 1 or 2, or (b) —X—Y, wherein:

X is an optional bridging group

Y is a maleimide, a substituted maleimide, an epoxy group, an oxazoline, a cyanate ester-substituted aryl, or an oxazine, and n≦about 8.

In preferred embodiments, X is an alkylene or oxyalkylene comprising up to about 20 atoms, or X is a siloxane, and Y is an optionally substituted maleimide or oxazine. In a particularly preferred embodiment, Y is a benzoxazine.

In another embodiment, polycyclic olefin monomers contemplated for use in the practice of the present invention have the following structure:

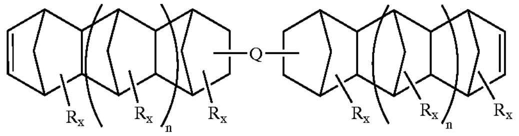

wherein:

R, x, and n are as defined above, and

Q is a bridging group selected from siloxane,

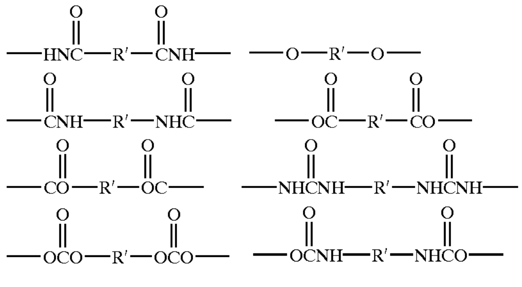

wherein R' is an alkylene, an arylene or a polycyclic hydrocarbyl. In preferred embodiments, Q is a tetramethyldisiloxane.

Maleimides contemplated for use in the practice of the present invention as component (B) have the following structure:

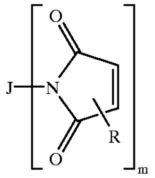

wherein:

R is hydrogen or lower alkyl

J— is:

(1) saturated straight chain alkyl or branched chain alkyl, optionally containing optionally substituted aryl moieties as substituents on said alkyl chain or as part of the backbone of said alkyl chain, and wherein said alkyl chains have up to about 20 carbon atoms, (2) aromatic groups having the structure:

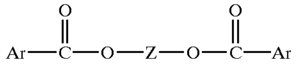

wherein:

each Ar is a monosubstituted, disubstituted or trisubstituted aromatic or heteroaromatic ring having in the range of 3 up to 10 carbon atoms, and Z is:

(i) saturated straight chain alkylene or branched chain alkylene, optionally containing saturated cyclic moieties as substituents on said alkylene chain or as part of the backbone of the alkylene chain, or (ii) polyalkylene oxides having the structure:

$—[(CR_2)_r—O—]_q—(CR_2)_s—$ wherein each R is independently as defined above, r falls in the range of 1 up to 10, s falls in the range of 1 up to 10, and q falls in the range of 1 up to 50, (3) di- or tri-substituted aromatic moieties having the structure:

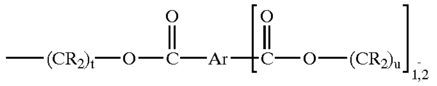

wherein each R is independently as defined above, t falls in the range of 2 up to 10, u falls in the range of 2 up to 10, and Ar is as defined above, (4) polyalkylene oxides having the structure:

$[(CR_2)_r—O—]_q—(CR_2)_s—$ wherein each R is independently as defined above, and wherein each of r, s and q are as defined above, (5) a polycyclic olefinyl, or (6) mixtures of any two or more thereof, and m is 1, 2, or 3.

In preferred embodiments, the maleimide is N-methylmaleimide, N-ethymaleimide, N-propylmaleimide, N-butylmaleimide, N-t-butylmaleimide, N-hexylmaeimide, N-2-ethylhexylmaleimide, N-cyclohexylmaleimide, N-octylmaleimide, N-decylmaleimide, N-dodecylmaleimide, N-phenylmaleimide, 2-methyl-N-phenylmaleimide, 4-methyl-N-phenylmaleimide, 2-ethyl-N-phenylmaleimide, 4-ethyl-N-phenylmaleimide, 2,6-diethyl-N-phenylmaleimide, and the like, or a mixture of any two or more thereof.

Succinimides contemplated for use in the practice of the present invention as component (B) have the following structure:

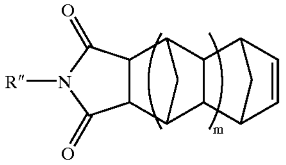

wherein:

each Q' is independently a lower alkyl or fluorinated lower alkyl,

R" is (1) saturated straight chain alkyl or branched chain alkyl, optionally containing optionally substituted aryl moieties as substituents on said alkyl chain or as part of the backbone of said alkyl chain, and wherein said alkyl species have up to 20 carbon atoms, (2) aromatic groups having the structure:

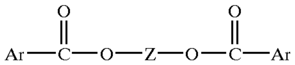

wherein each Ar is an optionally substituted nobornyl, a disubstituted or trisubstituted aromatic or heteroaromatic ring having in the range of 3 up to 10 carbon atoms, and Z is:

(i) saturated straight chain alkylene or branched chain alkylene, optionally containing saturated cyclic moieties as substituents on said alkylene chain or as part of the backbone of the alkylene chain, or (ii) polyalkylene oxides having the structure:

$$-[(CR'_2)_r-O-]_q-(CR'_2)_s-$$

wherein each R' is independently as defined above, r falls in the range of 1 up to 10, s falls in the range of 1 up to 10, and q falls in the range of 1 up to 50, (3) di- or tri-substituted aromatic moieties having the structure:

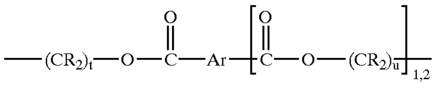

wherein each R' is independently as defined above, t falls in the range of 2 up to 10, u falls in the range of 2 up to 10, and Ar is as defined above (4) polyalkylene oxides having the structure:

$$-[(CR'_2)_r-O-]_q-(CR'_2)_s$$

wherein each R' is independently as defined above, and wherein each of r, s and q are as defined above, (5) a polycyclic olefinyl, or (6) mixtures of any two or more thereof, and each x is independently 0, 1 or 2, and $m \geqq 0$.

Free-radical curing co-monomers contemplated for use in the practice of the present invention include electron poor olefins such as, for example, unsaturated anhydrides, (meth) acrylates, styrenes, cyanate esters, vinyl esters, divinyl compounds, and the like.

In preferred embodiments, anhydrides contemplated for use in the practice of the present invention include maleic anhydride, citraconic anhydride, itaconic anhydride, and the like, or Diels-Alder adducts of maleic anhydride, citraconic anhydride, itaconic anhydride, and the like, and cyclopentadiene. Diels-Alder adducts contemplated for use in the practice of the present invention have the following structure:

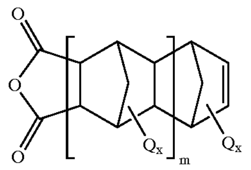

wherein each Q is independently an alkyl or substituted alkyl, each x is independently 0, 1 or 2, and $m \leqq 9$.

Divinyl compounds contemplated for use in the practice of the present invention are present such that there is no greater than one equivalent of divinyl compound plus said polycyclic olefin per equivalent of bismaleimide. The divinyl compounds have the following structure:

$$CHR_a=CR_a-Q_{0,1}-Y-Q_{0,1}-CR_a=CHR_a$$

wherein:

each $R_a$ is independently hydrogen, lower alkyl or aryl, each Q is independently —O—, —O—C(O)—, —C(O)— or —C(O)O—, —Y— is:

(1) saturated straight chain alkylene or branched chain alkylene, optionally containing saturated cyclic moieties as substituents on said alkylene chain or as part of the backbone of the alkylene chain, wherein said alkylene species have at least 6 carbon atoms, (2) di- or tri-substituted aromatic moieties having the structure:

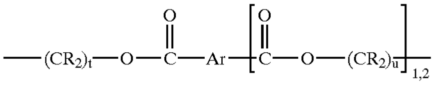

wherein each R is independently as defined above, Ar is as defined above, and each of t and u are as defined above, (3) polyalkylene oxides having the structure:

$$-[(CR_2)_r-O-]_q-(CR_2)_s-$$

wherein each R is independently as defined above, and wherein each of r, s and q are as defined above, (4) is derived from a dimer amine, and includes $-(CH_2)_9-CH(C_8H_{17})-CH(C_8H_{17})-(CH_2)_9-$, (5) a siloxane, or (6) mixtures of any two or more thereof.

Curing catalysts contemplated for use in the practice of the present invention include free-radical initiators such as peroxy esters, peroxy carbonates, hydroperoxides, alkylperoxides, arylperoxides, azo compounds, and the like.

The incorporation of polycyclic olefin monomers into a free radical curing thermoset imparts many useful properties to the final crosslinked material. It has been observed that these monomers increase the glass transition temperature of the thermoset while decreasing the coefficient of thermal expansion. Additionally, thermosets which contain polycyclic olefins have increased toughness versus those without these monomers. A further desirable benefit which can be attributed to these monomers when incorporated into a thermoset is low shrinkage upon cure. All of these properties are important in a variety of end use applications, such as for example optical disks, barrier films, medical appliances, and the like. In particular, the properties provided by these monomers are especially useful in semiconductor packaging applications such as, for example, die-attach adhesives. Invention compositions may be readily incorporated into die-attach formulations containing further components such as, for example, conductive fillers, to provide hydrophobic, low-shrinkage die-attach pastes.

Polycyclic olefin monomers contemplated for use in the practice of the present invention contain at least one unit of bicycloheptenyl unsaturation and are readily synthesized via Diels-Alder chemistry, as shown below in Scheme 1.

Scheme 1

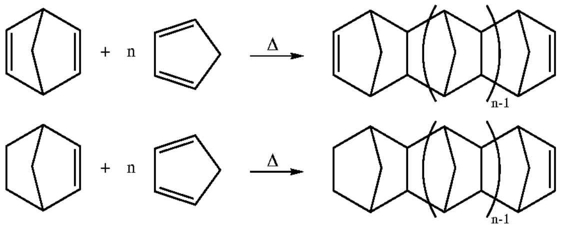

The temperatures required for this reaction to proceed are generally between 150 and 250° C. It is necessary to use an autoclave to conduct this reaction since all of the reactants have boiling points well below 100° C. Cyclopentadiene need not be used directly since this component of the reaction can be readily generated in situ from the retro Diels-Alder reaction of dicyclopentadiene. Both norbornene and norbornadiene are commercially available and convenient to use. Alternatively, these materials could also be generated in situ from ethylene or acetylene and cyclopentadiene, respectively, as shown in Scheme 2.

Scheme 2

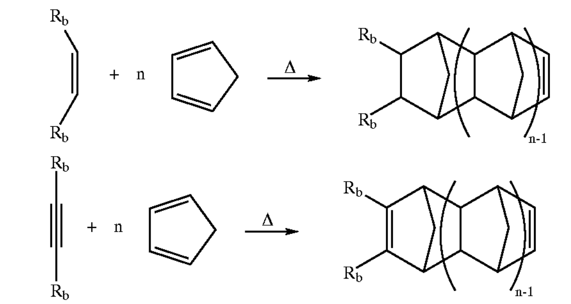

$R_b$=H, Me, higher alkyl, Ar, CN

As shown above, functionalized polycyclic olefin monomers are readily obtained via Diels-Alder chemistry. Further examples of functionalized polycyclic olefin monomers are shown below in Scheme 3. The reaction between cyclopentadiene and strong dienophiles such as, for example, maleic anhydride and N-alkyl maleimides, produces polycyclic olefin monomers which can increase adhesion of the thermoset material to a variety of surfaces.

Scheme 3

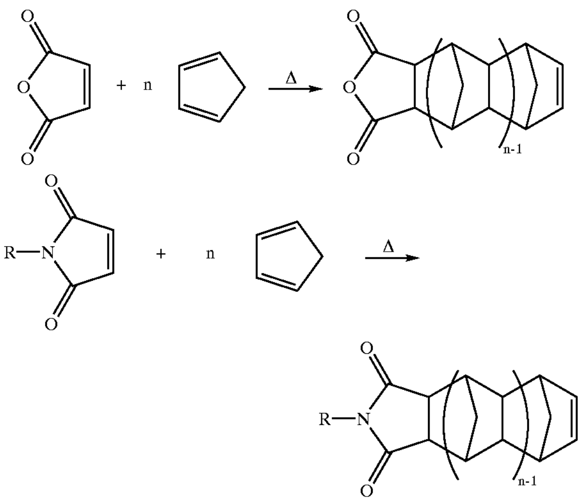

The polycyclic olefin monomers described in Schemes 1–3 are all high molecular weight analogs of norbornene or norbornadiene. As such, their vapor pressure is extremely low, resulting in very little outgassing or weight loss during high temperature cure. It is of note that these high molecular weight species are sufficiently reactive with electron deficient monomers to produce highly crosslinked networks. Indeed, electron rich polycyclic olefins readily copolymerize free radically with a variety of electron poor olefins, to give alternating copolymers, as shown in Scheme 4.

Scheme 4

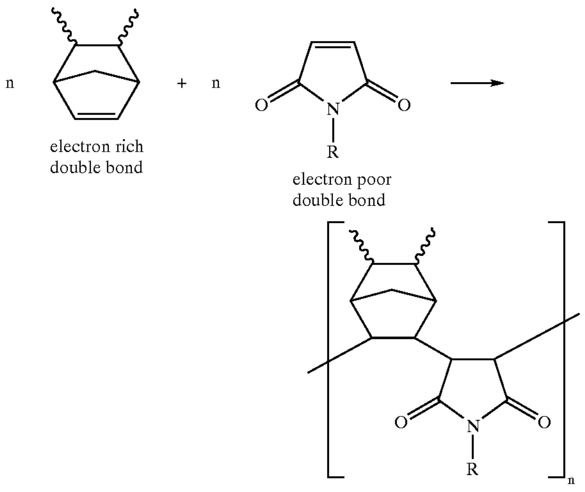

Thus, the polycyclic olefin monomers contemplated for use in the practice of the present invention can be copolymerized with a variety of electron deficient monomers to give a thermosetting composition which is sufficiently reactive to provide a highly crosslinked network. This reactivity can be extended to a variety of functionalized electron deficient olefins, resulting in thermoset resins with a wide range of attractive properties.

Invention compounds are particularly useful in the microelectronics industry, where properties such as hydrophobicity, ionic purity, low shrinkage upon cure, and the like, are extremely important. Indeed, formulations comprising invention compounds are attractive candidates for a variety of electronic packaging applications, such as, for example, die-attach pastes. The use of invention compounds in die-attach formulations provides die-attach pastes with high glass transition temperatures. This feature is particularly important since state of the art microprocessors generate more heat during operation than previous generations of microprocessors.

The properties provided by invention compounds are also desirable in other microelectronic packaging applications, such as, for example, underfill, encapsulants, solder mask, and the like.

The invention will now be described in greater detail by reference to the following non-limiting examples.

EXAMPLE 1

The preparation of 1,3-bis-bicyclo[2.2.1]hept-5-en-2-yl-1, 1,3,3-tetramethyldisiloxane, shown below, is described in this example.

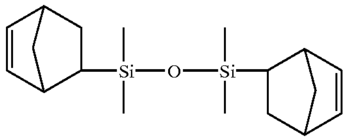

Bicyclo[2.2.1]hepta-2,5-diene (120 grams, 1.3 moles) and 1,1,3,3-tetramethyldisiloxane (27 grams, 0.2 moles) were placed into a 500 ml round-bottom flask equipped with a magnetic stir bar and a condenser. Three drops of platinum catalyst (Gelest "SIP6831.0") were added to this mixture at room temperature while it was stirred magnetically. The system was then heated to 70° C. and stirred at this temperature for another eight hours. The reaction was monitored via FTIR and was judged to be complete once the Si-H peak (2200 $cm^{-1}$) disappeared. The bicyclo[2.2.1 ]hepta-2,5-diene excess was stripped off in a rotary evaporator. The crude reaction product residue was then dissolved in 200 ml toluene and passed over a thin bed of silica gel. The toluene was then removed by rotary evaporation to yield a faintly yellow, low viscosity, liquid. The product was subjected to a nitrogen gas sparge at 60° C. for six hours to remove the last trace of volatiles. The final product was obtained in 96% yield, based on the initial 1,1,3,3-tetramethyldisiloxane limiting reagent used.

EXAMPLE 2

The preparation of 1,3-bis(2-bicyclo[2.2.1]hept-5-en-2-yl-ethyl)-1, 1,3,3-tetramethyldisiloxane, shown below, is described in this example.

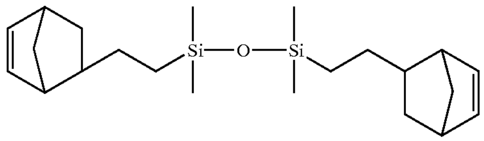

5-Vinyl-2-norbornene (72 grams, 0.6 moles) and 1,1,3,3-tetramethyldisiloxane (33.6 grams, 0.25 moles) were placed into a 500 ml round-bottom flask equipped with a magnetic stir bar and condenser. One drop of platinum catalyst (Gelest "SIP6831.0") was added to the magnetically stirred mixture at room temperature. A vigorous reaction ensued. The reaction mix was stirred at room temperature for another hour. The completion of the reaction was also determined by the total disappearance of the Si-H peak via FTIR. The excess 5-vinyl-2-norbornene was then stripped off in a rotary evaporator. The residue was dissolved in 200 ml toluene and passed over a thin layer of silica gel. The toluene was removed on a rotary evaporator and the residue was then sparged under nitrogen gas at 60° C. for several hours. The final product was obtained in 98% yield (based on the amount of 1,1,3,3-tetramethyldisiloxane originally charged). The product was an almost colorless, low viscosity liquid.

EXAMPLE 3

The invention compounds described in Examples 1 and 2 were tested in thermoset compositions with a bismaleimide monomer, X-BMI, shown below,

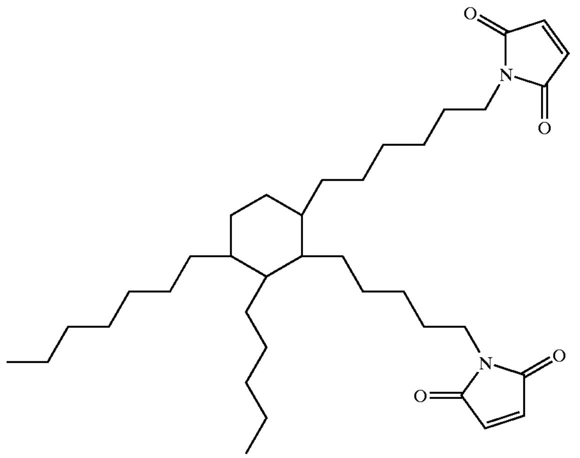

The results of these tests are described in Examples 4–6.

EXAMPLE 4

Stoichiometric mixtures (i.e. one equivalent of bisnorbornenyl monomer per maleimide equivalent) were made. Mix A contained a miscible blend of X-BMI; 1,3-bis-bicyclo [2.2.1]hept-5-en-2-yl-1,1,3,3-tetramethyldisiloxane ("compound I") and two percent by weight dicumyl peroxide. Mix B contained a miscible blend of X-BMI; 1,3-bis-(2-bicyclo[2.2.1]hept-5-en-2-yl-ethyl)-1,1,3,3-tetramethyldisiloxane ("compound II"), and two percent by weight dicumyl peroxide. A control mix was also made containing only X-BMI and two weight percent dicumyl peroxide.

These mixtures were tested for tensile adhesion on copper. Each mixture was used to bond ten aluminum studs to freshly cleaned copper slugs. The parts were cured at 200° C. for twenty minutes. Tensile adhesion was then measured on all of the parts using a Sebastian III stud pull instrument. The results of that test are shown in Table 1.

TABLE 1

Adhesion Test of BMI/Bisnorbornene Mixtures

| Part # | Invention Mix A Adhesion (pounds force) | Invention Mix B Adhesion (pounds force) | Control Mix Adhesion (pounds force) |
|---|---|---|---|
| 1 | 33 | 52 | 37 |
| 2 | 30 | 35 | 19 |
| 3 | 26 | 39 | 32 |
| 4 | 27 | 44 | 30 |
| 5 | 23 | 46 | 28 |
| 6 | 41 | 32 | 38 |
| 7 | 36 | 32 | 35 |
| 8 | 22 | 34 | 37 |
| 9 | 28 | 41 | 27 |
| 10 | 30 | 38 | 34 |
| Average | 30 | 39 | 32 |
| $\sigma_{n-1}$ | 5.8 | 6.5 | 5.9 |

The adhesion values for the bisnorbornene/BMI mixtures were substantially equivalent to that of the all-BMI control. This result suggested that the bisnorbornene compounds did co-cure with the bismaleimide since there was no loss of adhesion (which would have been expected if these co-monomers had remained as "uncured plasticisers" in the thermoset bondline).

EXAMPLE 5

The mixtures described in Example 3 were subjected to thermal gravimetric analysis (TGA) and differential scanning calorimetry (DSC) experiments. Included in these tests were two additional mixtures containing compounds I and II, each catalyzed with two percent of dicumyl peroxide. These new mixtures were designated "mix C" and "mix D", respectively. A third, additional mixture was made that contained X-BMI and 33.7% of 2-decyl-1-tetradecanol. The purpose of this last mixture was to have an additional control for weight loss and cure energy using a non-reactive diluent having a molecular weight intermediate between compounds I and II. This last mixture was designated "mix E". The TGA and DSC results for all of these mixtures and the control are shown in Table 2.

TABLE 2

TGA and DSC Results for Test Mixtures

| | Invention Mix A | Invention Mix B | Invention Mix C | Invention Mix D | Comparison Mix E | Control |
|---|---|---|---|---|---|---|
| TGA weight loss @ 350° C. | 3.75% | 3.14% | 82.3% | 54.5% | 29.7% | 1.98% |
| DSC cure exotherm (J/gram) | 296 | 264 | 106 | 57 | 192 | 284 |

The results in Table 2 clearly show that co-cure of norbornenyl functional monomers and maleimides does occur. Compounds I and II did exhibit some limited free radical cure by themselves, but this cure was far from complete as demonstrated by the large weight loss and low cure exotherm. The relatively low weight loss values for the A and B mixes as well as their high exotherm energies supports the conclusion that norbornenyl and maleimide co-cure does occur. Finally, comparison mix E added further proof of co-cure. This control had weight loss and cure results consistent with that of a non-reactive diluent. The weight loss of mix E, furthermore, demonstrated that compounds I and II weren't simply trapped within a cured BMI matrix since the weight loss at 350° C. was nearly equal to known added weight of the 2-decyl-1-tetradecanol.

EXAMPLE 6

Invention compositions were also tested for moisture uptake. Invention mixtures A and B were cured (200° C. for one hour) to give void free, cylindrical slugs that were approximately one centimeter in diameter and ranging between two and five centimeters in length. Similar slugs were prepared from the catalyzed BMI control mix. Three slugs from each group were included in a moisture up-take test. All of these slugs were placed in boiling deionized water for several hours. Initially, all of the samples had some weight loss, but this initial weight loss ceased after about 290 hours in the boiling water. This initial weight loss period was used to level all of the slugs by removing any residual water extractable components. The slugs were removed from the water after this initial water extraction step and then re-dried at 200° C. for eight hours. The dried parts were placed back in fresh deionized water and boiled for another twenty-four hours. The moisture up-take results for these test parts are summarized in Table 3.

TABLE 3

Moisture Up-take Results on Cured Resin Samples after 24 Hrs in Boiling Water

| Invention Mix A | Invention Mix B | X-BMI Control |
|---|---|---|
| +0.43% | +0.37% | +0.64% |
| +0.49% | +0.35% | +0.66% |
| +0.45% | +0.38% | +0.61% |

These moisture uptake results are consistent with reduced moisture affinity in the mixtures containing compounds I and II. The X-BMI itself is a very hydrophobic monomer. The results of this test clearly show that the hydrophobicity of the bismaleimide thermoset is further improved by the addition of select norbornenyl co-monomers.

While the invention has been described in detail with reference to certain preferred embodiments thereof, it will be understood that modifications and variations are within the spirit and scope of that which is described and claimed.

What is claimed is:

1. A free-radical polymerizable thermoset resin composition comprising:

(A) at least one polycyclic olefin monomer, said monomer having at least one terminal norbornenyl functional group, wherein said monomer contains little, if any, cyclopentenyl unsaturation, (B) a maleimide or succinimide, (C) optionally, one or more free radical curing co-monomers, and (D) at least one thermally activated free-radical curing catalyst.

2. A composition according to claim 1, wherein the polycyclic olefin monomer has the structure:

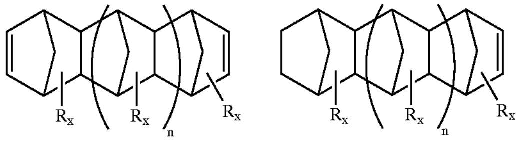

wherein each R is (a) independently hydrogen or substituted or unsubstituted alkyl, and each x is independently 0, 1 or 2, or (b) —X—Y, wherein:

X is an optional bridging group

Y is a maleimide, a substituted maleimide, an epoxy group, an oxazoline, a cyanate ester-substituted aryl, or an oxazine, and n≦about 8.

3. A composition according to claim 2, wherein said bridging group X is an alkylene or oxyalkylene comprising up to about 20 atoms.

4. A composition according to claim 2, wherein said bridging group X is a siloxane.

5. A composition according to claim 2, wherein Y is an optionally substituted maleimide or oxazine.

6. A composition according to claim 5, wherein Y is an oxazine.

7. A composition according to claim 6, wherein said oxazine is a benzoxazine.

8. A composition according to claim 1, wherein said polycyclic olefin monomer has the structure:

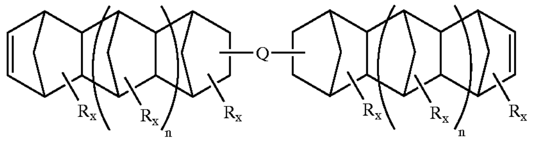

wherein:

R, x, and n are as defined above, and

Q is a bridging group.

9. A composition according to claim 8, wherein Q is selected from the group consisting of siloxane,

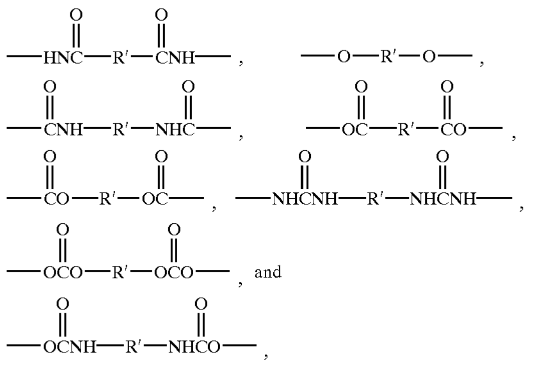

wherein R' is an alkylene, an arylene or a polycyclic hydrocarbyl.

10. A composition according to claim 9, wherein Q is a siloxane.

11. A composition according to claim 10, wherein the siloxane is tetramethyldisiloxane.

12. A composition according to claim 1, wherein said maleimide has the structure:

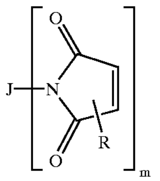

wherein:

R is hydrogen or lower alkyl

J— is:

(1) saturated straight chain alkyl or branched chain alkyl, optionally containing optionally substituted aryl moieties as substituents on said alkyl chain or as part of the backbone of said alkyl chain, and wherein said alkyl chains have up to about 20 carbon atoms, (2) aromatic groups having the structure:

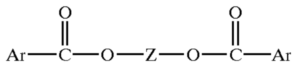

wherein:

each Ar is a monosubstituted, disubstituted or trisubstituted aromatic or heteroaromatic ring having in the range of 3 up to 10 carbon atoms, and Z is:

(i) saturated straight chain alkylene or branched chain alkylene, optionally containing saturated cyclic moieties as substituents on said alkylene chain or as part of the backbone of the alkylene chain, or (ii) polyalkylene oxides having the structure:

$$—[(CR_2)_r—O—]_q—(CR_2)_s—$$

wherein each R is independently as defined above, r falls in the range of 1 up to 10, s falls in the range of 1 up to 10, and q falls in the range of 1 up to 50, (3) di- or tri-substituted aromatic moieties having the structure:

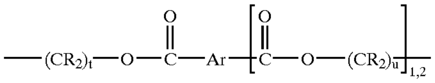

wherein each R is independently as defined above, t falls in the range of 2 up to 10, u falls in the range of 2 up to 10, and Ar is as defined above, (4) polyalkylene oxides having the structure:

$$[(CR_2)_r—O—]_q—(CR_2)_s—$$

wherein each R is independently as defined above, and wherein each of r, s and q are as defined above, (5) a polycyclic olefinyl, or (6) mixtures of any two or more thereof, and m is 1, 2, or 3.

13. A composition according to claim 12, wherein said maleimide is selected from the group consisting of N-methylmaleimide, N-ethylmaleimide, N-propylmaleimide, N-butylmaleimide, N-t-butylmaleimide, N-hexylmaleimide, N-2-ethylhexylmaleimide, N-cyclohexylmaleimide, N-octylmal eimide, N-decylmaleimide, N-dodecylmaleimide, N-phenylmaleimide, 2-methyl-N-phenylmaleimide, 4-methyl-N-dodecylmaleimide, 2-ethyl-N-phenylmaleimide, 4ethyl-N-phenylmaleimide, and 2,6-diethyl-N-phenylmaleimide.

14. A composition according to claim 1, wherein said succinimide has the structure:

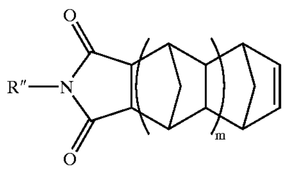

wherein:

each Q' is independently a lower alkyl or fluorinated lower alkyl,

R"— is (1) saturated straight chain alkyl or branched chain alkyl, optionally containing optionally substituted aryl moieties as substituents on said alkyl chain or as part of the backbone of said alkyl chain, and wherein said alkyl species have up to 20 carbon atoms, (2) aromatic groups having the structure:

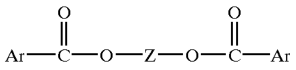

wherein each Ar is an optionally substituted nobornyl, a disubstituted or trisubstituted aromatic or heteroaromatic ring having in the range of 3 up to 10 carbon atoms, and Z is:

(i) saturated straight chain alkylene or branched chain alkylene, optionally containing saturated cyclic moieties as substituents on said alkylene chain or as part of the backbone of the alkylene chain, or (ii) polyalkylene oxides having the structure:

$$-[(CR'_2)_r-O-]_q-(CR'_2)_s-$$

wherein each R' is independently as defined above, r falls in the range of 1 up to 10, s falls in the range of 1 up to 10, and q falls in the range of 1 up to 50, (3) di- or tri-substituted aromatic moieties having the structure:

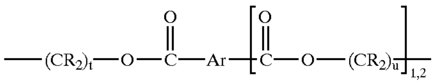

wherein each R' is independently as defined above, t falls in the range of 2 up to 10, u falls in the range of 2 up to 10, and Ar is as defined above (4) polyalkylene oxides having the structure:

$$-[(CR'_2)_r-O-]_q-(CR'_2)_s$$

wherein each R' is independently as defined above, and wherein each of r, s and q are as defined above, (5) a polycyclic olefinyl, or (6) mixtures of any two or more thereof, and each x is independently 0, 1 or 2, and m≧0.

15. A composition according to claim 1, wherein said free-radical curing comonomer(s) is not optional, and is selected from the group consisting of unsaturated anhydride, (meth)acrylate, styrene, cyanate ester, vinyl ester, and a divinyl compound.

16. A composition according to claim 15, wherein said free-radical curing comonomer is unsaturated anhydride.

17. A composition according to claim 16, wherein said unsaturated anhydride is selected from the group consisting of maleic anhydride, citraconic anhydride, itaconic anhydride, and cyclopentadiene Diels-Alder adducts thereof.

18. A composition according to claim 17, wherein said Diels-Alder adducts have the structure:

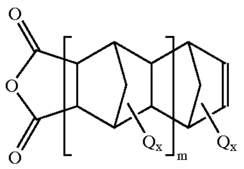

wherein:

each Q is independently an alkyl or substituted alkyl, each x is independently 0, 1 or 2, and m≦9.

19. A composition according to claim 15, wherein said comonomer is a divinyl compound.

20. A composition according to claim 19, wherein said divinyl compound has the following structure:

$$CHR_a=CR_a-Q_{0.1}-Y-Q_{0.1}-CR_a=CHR_a$$

wherein:

each R is independently hydrogen, lower alkyl or aryl, each Q is independently —O—,—O——C(O)—,—C(O)— or—C(O)O—, —Y— is:

(1) saturated straight chain alkylene or branched chain alkylene, optionally containing saturated cyclic moieties as substituents on said alkylene chain or as part of the backbone of the alkylene chain, wherein said alkylene species have at least 6 carbon atoms, (2) di- or tri-substituted aromatic moieties having the structure:

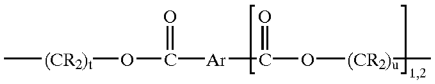

wherein each R is independently as defined above, Ar is as defined above, and each of t and u are as defined above, (3) polyalkylene oxides having the structure:

$$-[(CR_2)_r-O-]_q-(CR_2)_s-$$

wherein each R is independently as defined above, and wherein each of r, s and q are as defined above, (4) is derived from a dimer amine, and includes $-(CH_2)_9-CH(C_8H_{17})-CH(C_8H_{17})-(CH_2)_9-$, (5) a siloxane, or (6) mixtures of any two or more thereof.

21. A composition according to claim 1, wherein said curing catalyst is selected from the group consisting of peroxy ester, peroxy carbonate, hydroperoxide, alkylperoxide, arylperoxide, and an azo compound.

22. A die-attach formulation comprising:

(a) a thermosetting composition according to claim 1, and (b) a conductive filler.

23. A die-attach formulation according to claim 22 wherein said filler is electrically conductive.

24. A die-attach formulation according to claim 22 wherein said filler is thermally conductive.

25. An assembly employing a die-attach formulation according to claim 21.

26. A method for adhesively attaching a device to a substrate, said method comprising curing a die-attach formulation according to claim 22 positioned between said substrate and said surface.

27. A method according to claim 26, wherein said device is a semiconductor die and said substrate is a lead frame.

28. A method according to claim 27, wherein said lead frame is a copper lead frame.

* * * * *

UNITED STATES PATENT AND TRADEMARK OFFICE
CERTIFICATE OF CORRECTION

PATENT NO. : 6,521,731 B2
DATED : February 18, 2003
INVENTOR(S) : Stephen M. Dershem and Kevin J. Forrestal It is certified that error appears in the above-identified patent and that said Letters Patent is hereby corrected as shown below:

Column 4,
Line 25, change "N-hexylmaeimide" to -- N-hexylmaleimide --

Column 14,
Line 44, delete "dodecylmaleimide" and substitute -- phenylmaleimide --
Line 45, change "4ethyl" to -- 4-ethyl --

Signed and Sealed this

Seventh Day of October, 2003

JAMES E. ROGAN
*Director of the United States Patent and Trademark Office*